Aug. 31, 1937.  J. E. BATIE  2,091,578
METHOD AND APPARATUS FOR FORMING DISKS
Filed Sept. 16, 1935  6 Sheets-Sheet 1

INVENTOR
JOSEPH E. BATIE
BY Whittemore Hulbert
Whittemore & Belknap
ATTORNEYS

Aug. 31, 1937.   J. E. BATIE   2,091,578
METHOD AND APPARATUS FOR FORMING DISKS
Filed Sept. 16, 1935   6 Sheets-Sheet 2

INVENTOR
JOSEPH E. BATIE
BY Whittemore Hulbert
Whittemore & Belknap
ATTORNEYS

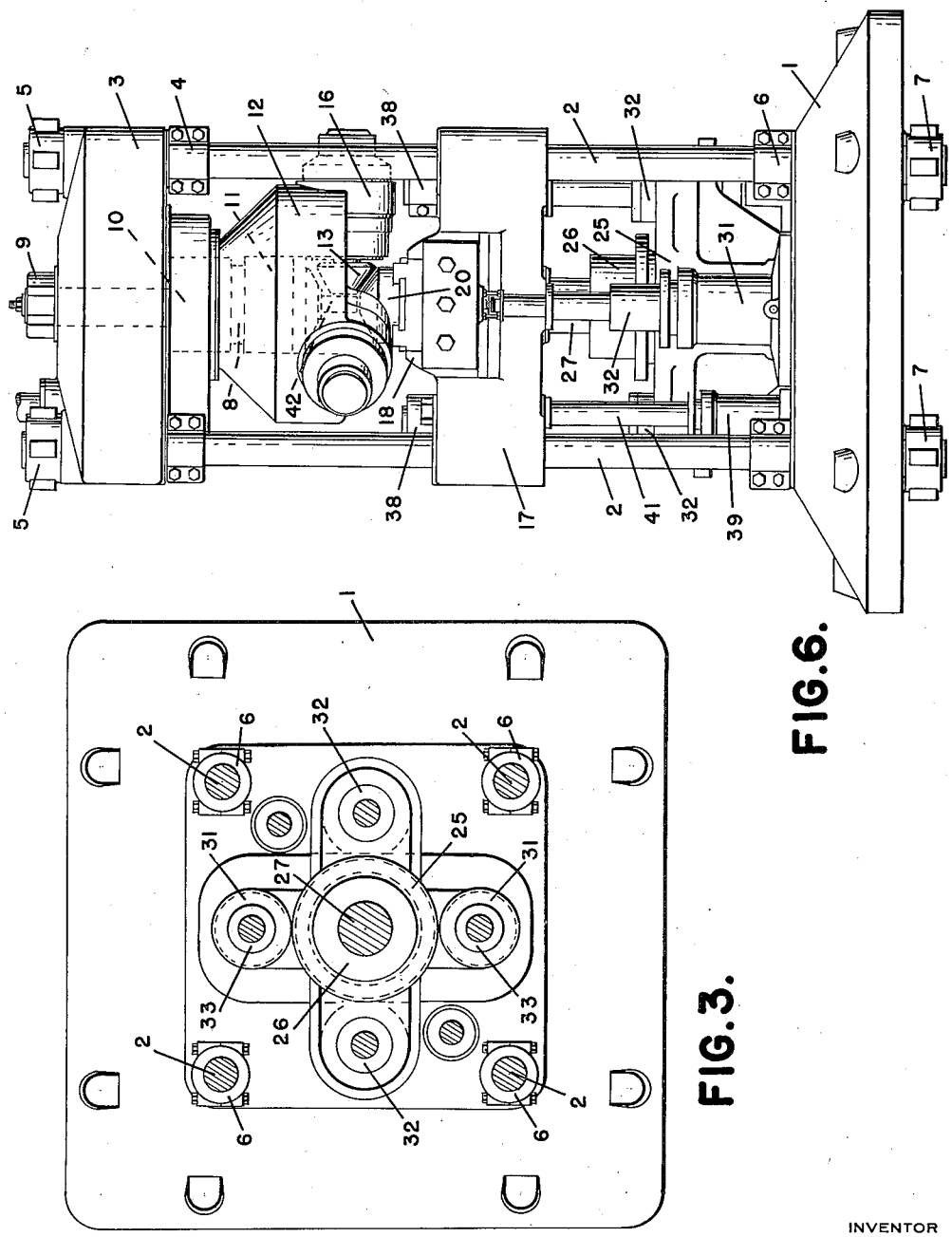

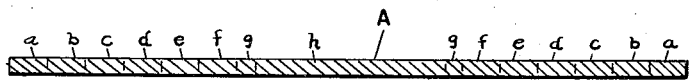
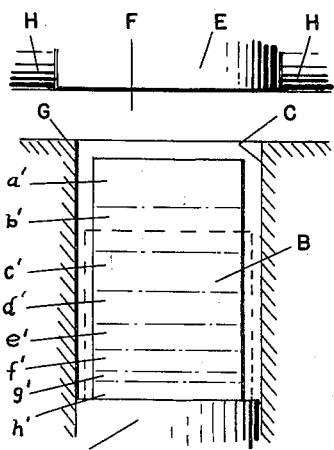
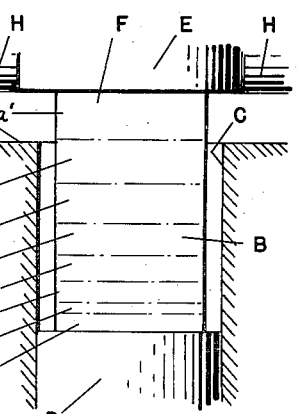
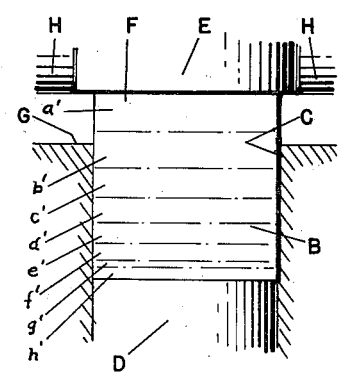
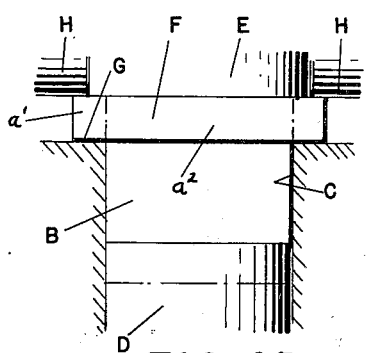
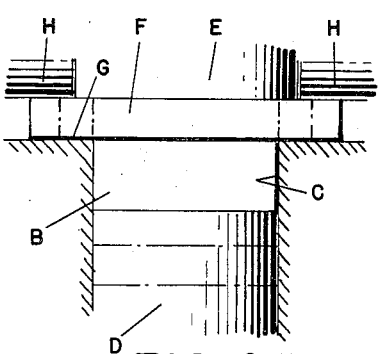
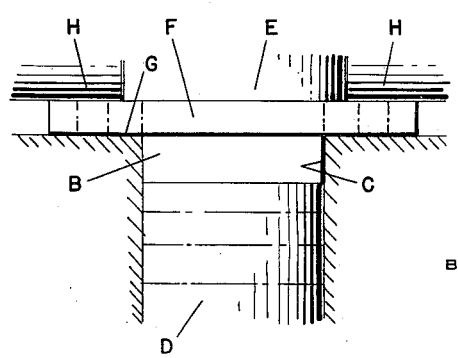

Aug. 31, 1937.  J. E. BATIE  2,091,578
METHOD AND APPARATUS FOR FORMING DISKS
Filed Sept. 16, 1935   6 Sheets-Sheet 5
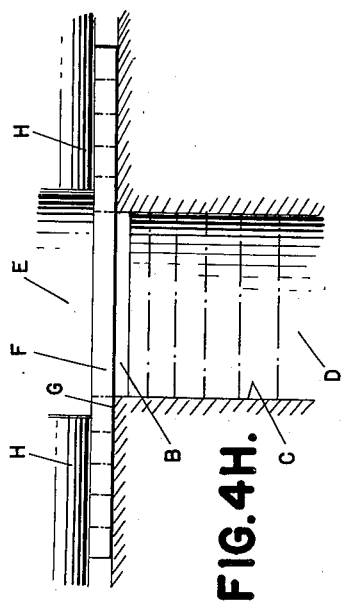
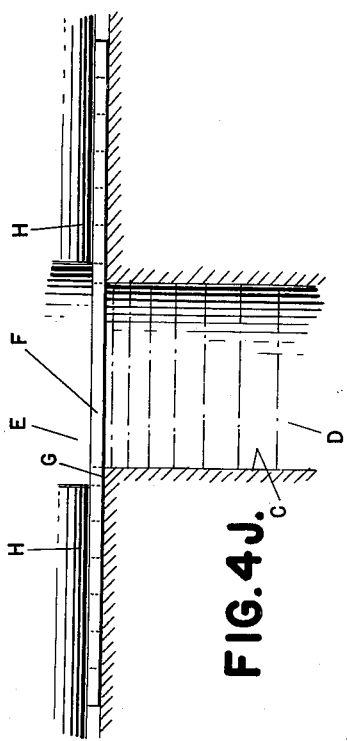
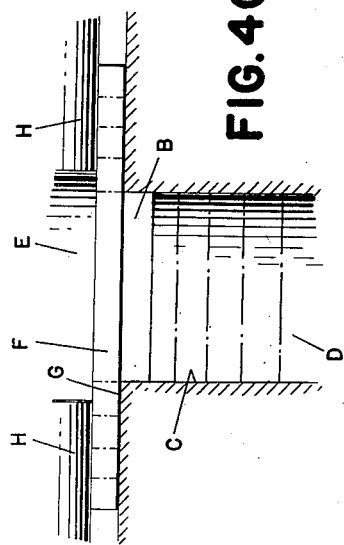
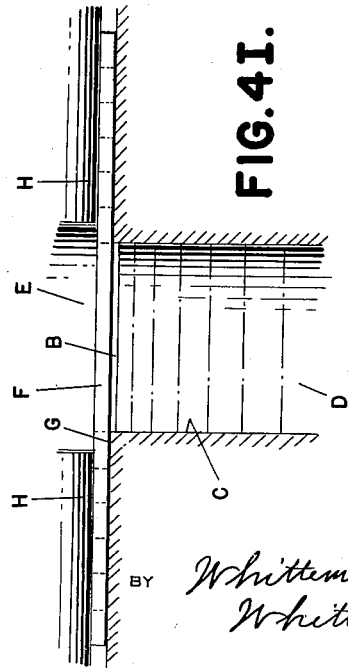
INVENTOR
JOSEPH E. BATIE
BY Whittemore Hulbert
Whittemore & Belknap
ATTORNEYS Aug. 31, 1937.                J. E. BATIE                2,091,578
                  METHOD AND APPARATUS FOR FORMING DISKS
                     Filed Sept. 16, 1935        6 Sheets-Sheet 6
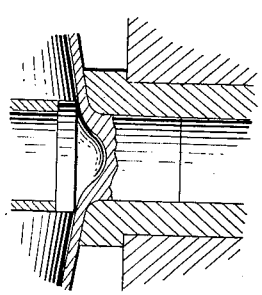
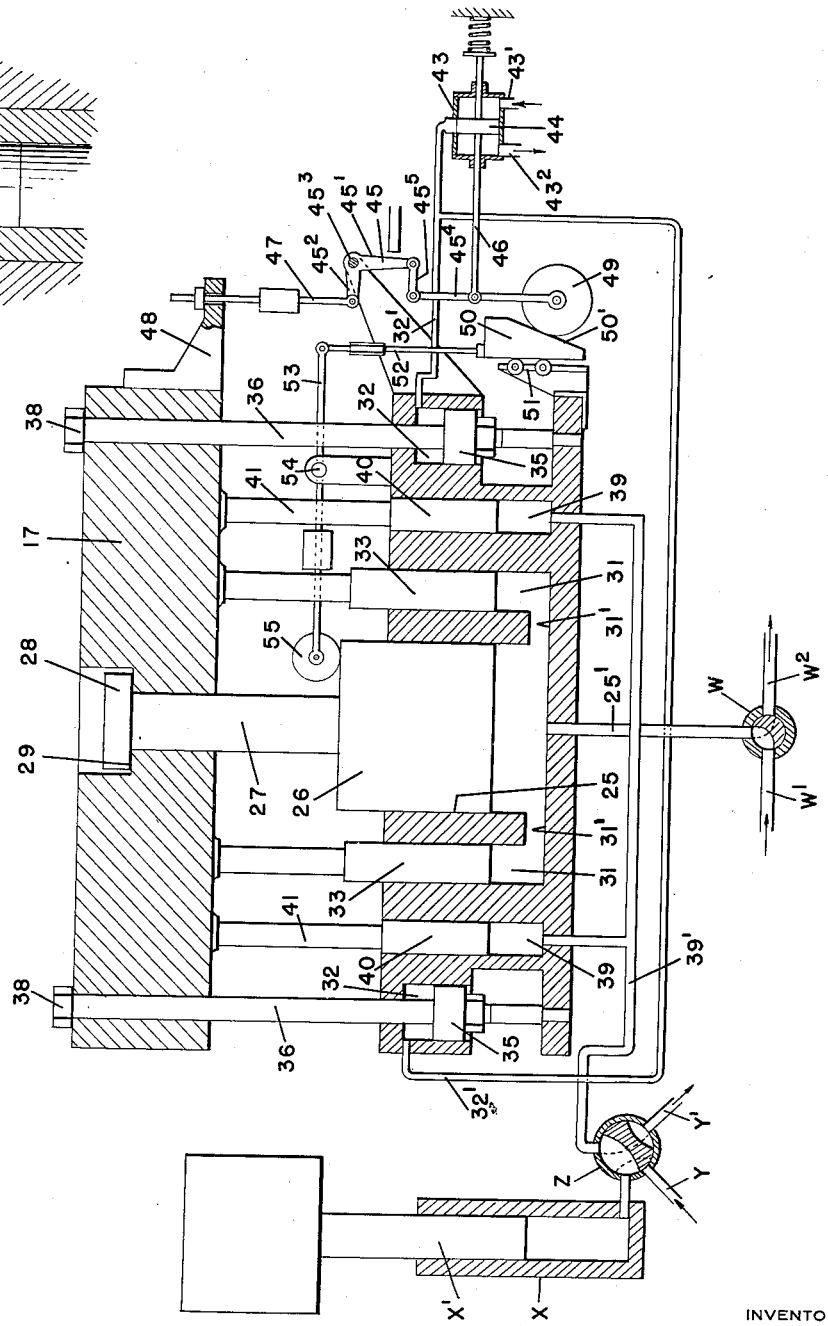
FIG. 5.
FIG. 7.
INVENTOR
JOSEPH E. BATIE
BY Whittemore Hulbert
   Whittemore & Belknap
                    ATTORNEYS Patented Aug. 31, 1937

2,091,578

UNITED STATES PATENT OFFICE 2,091,578

METHOD AND APPARATUS FOR FORMING DISKS

Joseph E. Batie, Detroit, Mich., assignor to Kelsey-Hayes Wheel Company, Detroit, Mich., a corporation of Delaware Application September 16, 1935, Serial No. 40,824

11 Claims. (Cl. 29—35)

The invention relates to the manufacture of metal disks such as are used in the manufacture of vehicle wheels, brake drums, etc. It is the object of the invention to obtain an improved method and apparatus by means of which the cost of manufacture is greatly reduced and the character of the product improved. To this end the invention consists in the novel process and apparatus, including a combination of radial extrusion and circular rolling, as hereinafter set forth.

To fashion metal by extrusion requires apparatus of an exceedingly rigid character to withstand the enormous pressures to which the extruded metal is subjected. However, where these conditions are fulfilled, a heated metal billet may be caused to flow outward through an orifice to impart thereto the desired form. If the orifice is annular the billet will be extruded radially, but there is a limit to the amount of radial expansion due to the increasing circumferential length and the high tension stresses thereby developed which, if exceeding the elastic limit, will cause rupture.

Another method of radially expanding a blank is by circular rolling. This also has its limit in that portions of the blank of different radii will be differentially expanded, thereby developing radial tension stresses which, if exceeding the elastic limit will cause rupture in a circular direction.

In order to avoid the defects of each of these methods of expanding a circular blank, I have combined the two, first, extruding an annulus with the incidental development of circumferential stresses but remaining within the elastic limit of the material and then circularly rolling this annulus to relieve the stresses and to further radially enlarge and thin the blank. In performing these operations the annular orifice through which the metal is radially extruded is progressively diminished in width to correspond to the thinning of the blank by circular rolling so that at the completion of the process, all portions of the disk are brought to the desired gauge.

The apparatus for carrying out this method may be variously designed but in every instance must possess sufficient rigidity to withstand the high pressures and to hold the relative movable parts to accurate gauge. One form of apparatus is shown in the accompanying drawings in which Fig. 1 is a vertical central section through the machine;

Fig. 3 is a horizontal section;

Fig. 4 is a cross section through a completed disk;

Figure 1:
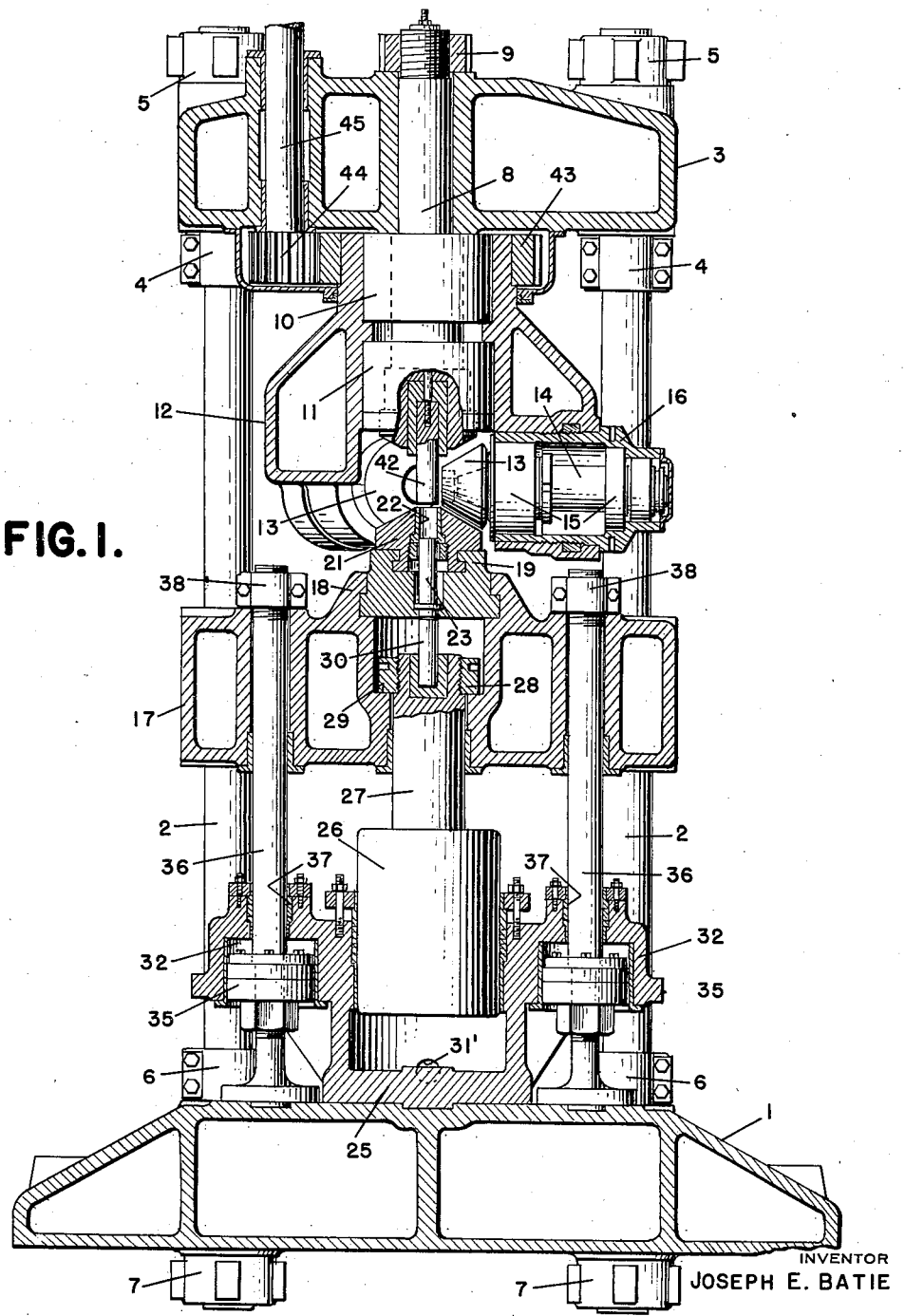
Figure 2:
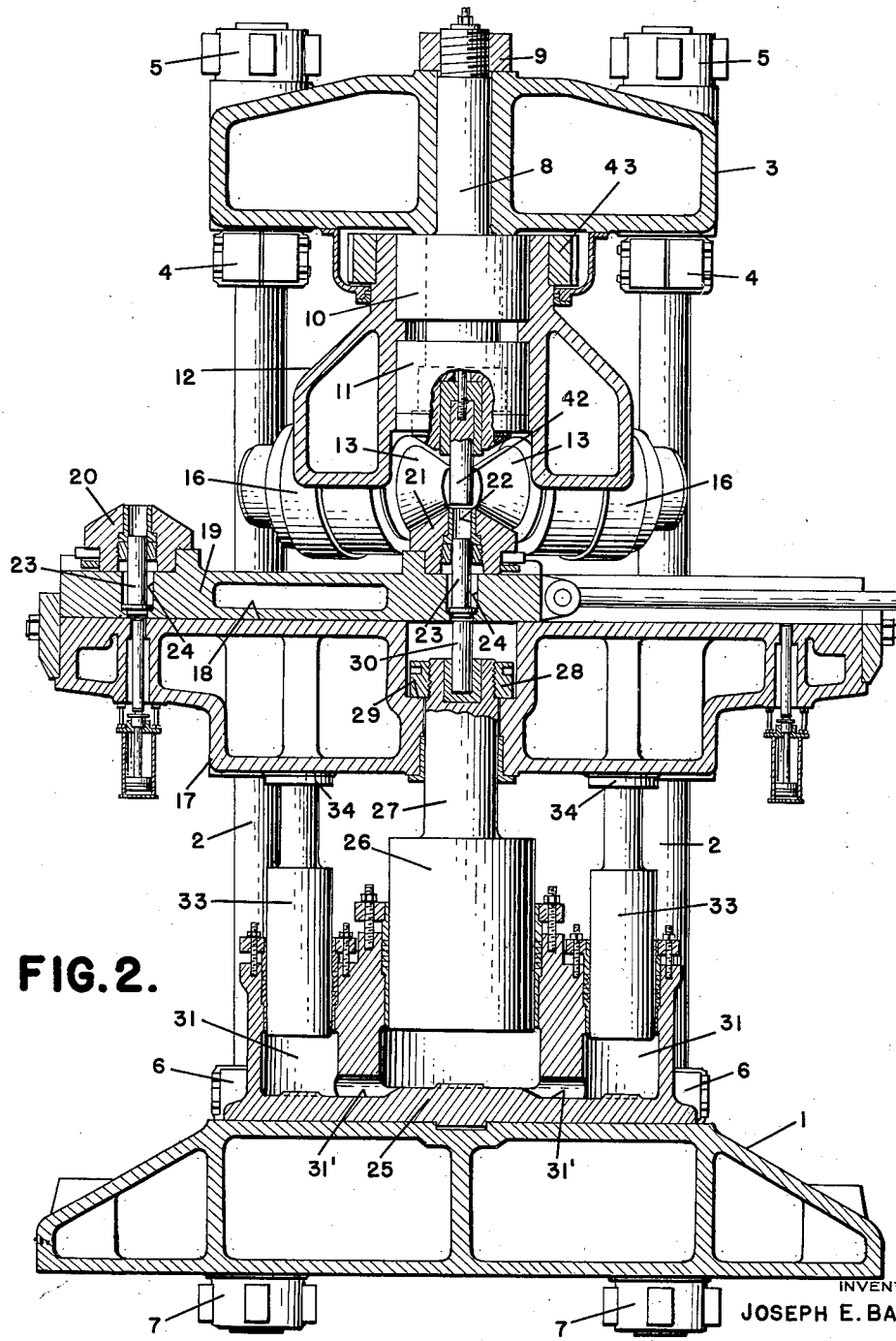
Fig. 2 is a section at right angles to Fig. 1.

Figs. 4A, 4B, 4C, 4D, 4E, 4F, 4G, 4H, 4I, and 4J are diagrams illustrating the successive steps in the forming of a disk;

Fig. 4K is a view similar to Fig. 4 showing a disk of tapered cross section;

Fig. 5 is a cross section showing a modified construction of extrusion means;

Fig. 6 is a side elevation of the machine illustrated in Figs. 1 to 3;

Fig. 7 is a diagrammatic representation of the means for controlling the operation of the machine.

Method

The method of forming a disk is illustrated in a series of diagrams, Figs. 4, 4A, 4B, etc., which trace the progress of the metal of the original billet as it is transformed into the disk. Fig. 4 illustrates a completed circular disk A of uniform thickness and a series of zones in this disk are designated by the letters $a$, $b$, $c$, $d$, $e$, $f$, $g$, and $h$. Each of these zones is of equal width radially with the exception of the zones $g$ and $h$, but the diameters progressively increase from five inches for the periphery of the zone $h$ to eighteen inches for the periphery of the zone $a$. Fig. 4A represents a central longitudinal section through a billet B which is equal in volume to the volume of the disk A. This billet may be regarded as including a series of sections $a'$, $b'$, $c'$, $d'$, $e'$, $f'$, $g'$, and $h'$, respectively, corresponding in volume to the portions of the disk in the zones $a$–$h$ respectively.

Fig. 4C represents the billet in the cylinder C and under compression between the extrusion plunger D and a stationary abutment E, which latter is separated from the cylinder to form therebetween an annular orifice F. The top face G of the cylinder C forms a platen and a roller is represented at H which is in alignment with the face of the abutment E. Fig. 4D represents the position of parts after the plunger D has extruded a volume equal to the volume $a'$, the width of the orifice F having been simultaneously contracted by the upward movement of the cylinder C and platen G with respect to the abutment E and rolls F. The extruded annulus $a^2$ will be of a total volume corresponding to the volume $a'$ of the billet and also the volume of the zone $a$ of the completed disk. Figs. 4E, 4F, 4G, 4H, 4I, and 4J show the successive steps up to the completion of the disk shown in Fig. 4. It will be noted that the contraction of the orifice F corresponds to the thinning of the blank by the rolls H at each stage in the operation, so that in Fig. 4J the last portion of the billet forming the center of the disk, is of the same thickness as in all of the other zones. This is also accomplished without abnormally stressing the metal in any direction, for the circumferential stresses caused by extrusion are relieved by the rolling and the mass of metal extruded in each step is just sufficient to form the corresponding zone with balanced radial and circumferential stresses.

The process as thus far described is such as would be used for forming disks of uniform thickness from center to periphery, but it is frequently desirable to form disks of outwardly tapering section. Such a disk is represented in Fig. 4K, and the only modification required is an alteration in the amount of metal extruded for forming each of the successive zones and a change in the angle of the face of the roller with respect to that of the platen.

Machine

The machine as specifically illustrated in Figs. 1 to 3 inclusive, comprises a suitable bed plate 1 having rising therefrom four columns 2 and mounted upon the upper ends of these columns is a crown 3 positioned by collars 4 and 5 having a threaded engagement with the columns. In the same manner the lower ends of the columns are rigidly positioned with respect to the bed by collars 6 and 7. Depending centrally from the crown 3 is a vertical spindle 8 which has a shank of reduced diameter passing through the crown and secured by a nut 9. This spindle forms a support for roller bearings 10 and 11 for rotatively supporting a head 12. This head carries a series of rollers 13 preferably three in number having their axes arranged radially with respect to the axis of the spindle 8. Each roller 13 is preferably of conical form and is provided with an outwardly extending shank 14 which is mounted in roller bearings 15 in a housing 16 secured to the head 12.

Below the head 12 there is slidably mounted upon the columns 2 a cross head 17 having formed thereon horizontal guideways 18 for a reciprocatory carriage 19. Upon this carriage are mounted platens 20 and 21 adapted to be alternatively registered with the rollers 13 and in axial alignment with the spindle 8. However, to prevent interference of these platens with the rollers during transit the cross head 17 is adapted to be lowered upon the columns 2 and then raised to a predetermined position.

Each of the platens has a conical face against which the disk is to be rolled and at the center of the cone is provided with a cylindrical recess 22 for receiving the billet to be extruded. 23 is the extrusion plunger engaging the recess 22 and depending into a recess 24 in the carriage 19. Centrally beneath the cross head 17 and mounted upon the base 1 is an hydraulic cylinder 25 having a piston 26 therein and an upwardly extending shank 27 which is guided in a bearing in the cross head. The upper end of the shank 27 has a collar 28 threaded thereon and adapted to engage a shoulder 29 to limit downward movement of the piston. Between the shank 27 and the plunger 23 is a push rod 30 so arranged as to clear the carriage 19 and plunger 23 during movement of the carriage while aligning with the plunger and platen in registration with the rolls 13.

For raising and lowering the cross head 17 and for also controlling the movement thereof relative to the movement of the extrusion plunger 23 I have provided an hydraulic operating mechanism of the following construction: 31 are hydraulic cylinders supported on the bed 1 on diametrically opposite sides of the cylinder 25 and in the plane of the section of Fig. 2. 32 are cylinders on diametrically opposite sides of the cylinder 25 in the plane of the section of Fig. 1. Within the cylinders 31 are pistons 33 having upwardly extending shanks engaging the cross head 17 with a supporting shoulder 34 for said cross head. The cylinders 32 are reversed in position and have pistons 35 therein exposed to hydraulic pressure on their upper sides. The shanks 36 of the pistons 35 extend upward through a packing gland 37 and through aligned bearings in the cross head 17, being provided at their upper ends with stop collars 38. Thus the cross head 17 is freely slidable upon the shanks 36, but the upward movement is limited by the collars 38 and the hydraulic pressure in the cylinders 32. A third pair of cylinders 39 arranged in a diagonal plane on opposite sides of the cylinder 25 contains pistons 40 connected by shanks 41 with the cross head 17. These pistons 40 are actuated in the same direction as the pistons 33 but their function is to quickly raise and lower the cross head so as to clear the rollers during movement of the carriage while the function of the pistons 33 is to move the cross head and platens during the performance of the work of forming the disk. Depending from the spindle 8 in axial alignment therewith is an abutment member 42 which is of a diameter somewhat greater than the diameter of the extrusion cylinder 22 and in connection with the latter forms an annular extrusion orifice.

Operation

In the operation of forming disks, rotary motion is communicated to the head 12 by suitable means such as the gear wheel 43 thereon engaging a pinion 44 on a shaft 45 driven from any suitable source of power and at a predetermined speed. The billets B heated to the proper temperature such as 2200° F. for a billet of steel, are successively introduced into the cylinders 22, being engaged with that cylinder which is out of registration with the rolls. When the heated billet is thus introduced the cross head 17 is in its lower position and the carriage 19 is then reciprocated preferably by the operation of an hydraulic cylinder (not shown) to bring the platen into registration with the rolls and the extrusion cylinder and plunger 23 into registration with the central hydraulic cylinder 25. As soon as the parts are thus registered the pistons 40 in the cylinders 39 are raised to carry upward the cross head 17 as far as permitted by the collars 38 and pistons 35 in the hydraulic cylinders 32. The area of these pistons exposed to hydraulic pressure is greater than the area of the pistons 33 in the cylinders 31 and the hydraulic pressure in the cylinders 32 is also preferably higher than that in the cylinders 31. Thus further upward movement of the cross head 17 is opposed by the pistons 35 and can not be overcome by the pistons 33. Provision is, however, made for permitting gradual escape of fluid from the cylinders 32, thereby causing the cross head 17 to be gradually raised, carrying with it the platen 21 and cylinder 22. At the same time the hydraulic pressure in the cylinder 25 operating upon the piston 26 will cause the upward movement of the extrusion plunger 23, forcing the heated metal to flow laterally outward through the annular orifice. By proper control the upward movement of the platen will correspond to the radial extrusion of the metal to perform the successive operations described in connection with Figs. 4 to 4I inclusive.

While I have described the construction of machine employing a conical platen and cooperating conical rolls it is obvious that the specific shape of these members may be varied. Also in place of a flat abutment against which the billet is pressed by the extrusion plunger, this abutment may be changed to any desired contour. Thus as shown in Fig. 5, a rounded conical projection at the center of the abutment may facilitate the easy flow of the metal in a radially outward direction.

If it is desired to form a disk integral with a hub, this may be accomplished by suitably fashioning the abutment and the extrusion plunger so that after the extrusion of the metal which forms the disk, that remaining in the cavity will be fashioned to form the hub.

The billets from which the disks are extruded may be formed from bar stock cut to suitable lengths. It is not essential that this stock should be round or of a size to exactly fit the extrusion cylinder. Thus as shown in dotted lines in Fig. 4A a billet substantially square in cross section may be introduced into the cylinder and provided that this is of proper mass, the initial movement of the plunger will cause lateral expansion to completely fill the cylinder.

In operation the rate of extrusion is preferably such that only those portions of the disk directly under the rollers are in contact with the platen, the other portions being spaced therefrom, thereby conserving the heat in the metal.

Figure 7 diagrammatically illustrates an arrangement for automatically controlling the upward movement of the platen in which is positioned the heated billet to be worked or fashioned. As illustrated in this figure, the lower end of the cylinder 25 is adapted to be placed in direct communication through the conduit 25' with a source of liquid, such as water under pressure, and the lower ends of the cylinders 31 are in direct communication with the lower end of the cylinder 25 through the conduits 31'. The upper ends of the cylinders 32 are in communication with the conduits 32' which lead to the valve casing 43 and open thereinto at its middle. One end of this casing is adapted to be placed in direct communication through the inlet conduit 43' with a source of liquid, such as oil under pressure. The other end of the casing communicates with the exhaust conduit 43². 44 is a valve in the casing 43 and preferably of very slightly less length than the internal diameter of the conduits 32'. This valve is reciprocable to control communication of the conduits 32' with either the inlet conduit 43' or the exhaust conduit 43².

For reciprocating the valve, I have provided the following arrangement:

45 is a bell crank lever having the long and short arms 45' and 45² respectively. This bell crank lever is pivotally mounted at 45³. The valve 44 is pivotally connected to one end of the rod 46, the other end of which is pivotally connected to a rod 45⁴ which latter is connected by a link 45⁵ to the long arm 45'. The free end of the short arm 45² is pivotally connected to the lower end of the link 47, the upper end of which is pivotally connected to the bracket 48 which is fixedly secured to the cross head 17. The lower end of the rod 45⁴ is preferably provided with the roller 49 which is engageable with the cam face 50' of the cam member 50. This cam member is slidable vertically upon a suitable guideway 51 and it is pivotally connected at its upper end to the lower end of the link 52. The upper end of this link is pivotally connected to the lever 53 which is pivotally mounted immediate its ends at 54 and which is preferably provided at the end opposite the link 52 with the roller 55 adapted to be engaged by the piston 26.

With this arrangement upward movement of the piston 26 and the extrusion plunger 23 causes the cam member 50 to move downwardly through the lever 53 and the link 52. As a result, the cam face 50' swings the bell crank lever 45 in a direction to move the valve 44 through the rod 46 to a position placing the conduits 32' in communication with the exhaust conduit 43². This provides for relieving the pressure in the cylinders 32 so that the pistons 33 can move the cross head 17 and consequently the platen upwardly to diminish the width of the extrusion orifice. Upward movement of the cross head through the link 47 tends to swing the bell crank lever 45 in the opposite direction to move the valve 44 through the rod 46 in a direction to place the conduits 32' in communication with the inlet conduit 43'. However, this movement of the valve does not occur until the cross head has moved upwardly too great a distance.

By changing the contour of the cam face 50', the relative rates of upward movement of the extrusion plunger and the cross head may be readily varied, it being necessary to select the proper contour cam face for each modification of disk to be formed.

To accomplish the rapid lowering and raising of the cross head 17 for the purpose of removing a finished disk and placing a new billet in engagement with the extrusion cylinder the machine is preferably provided with an hydraulic accumulator. This, as diagrammatically shown in Figure 7, includes a large cylinder X having a weighted piston X' in engagement therewith. Fluid under pressure is normally supplied to this cylinder from a conduit Y controlled by a valve Z. This valve is also adapted to alternatively connect the accumulator with the conduit 39' leading to the cylinders 39, or to connect said conduit 39' with an exhaust conduit Y'. In operation, when it is desired to lower the cross head 17 the valve Z is adjusted to connect the conduit 39' with the exhaust conduit Y' which permits the lowering of the cross head and piston supporting the same. The valve Z is then adjusted to the position, shown in full lines in Figure 7, where the liquid in the accumulator is rapidly discharged through the conduit 39' into the cylinders 39 to quickly raise the cross head 17. The liquid for the cylinders 25 and 31 entering through the conduit 25' is controlled by a valve W which during the raising of the cross head 17 is in the position shown in full lines to admit fluid to the cylinders from the conduit W' and when the cross head is to be lowered is in a position to connect said cylinders with the exhaust conduit W². The construction just described is only diagrammatic, but will serve to illustrate in a general way the method of operation.

What I claim as my invention is:

1. The method of forming metallic disks comprising the radial extrusion of metal through an annular orifice to expand the same within the elastic limit of the material and the circular rolling of said expanded blank to further expand the same and to relieve it from the stresses incident to extrusion.

2. The method of forming metallic disks comprising the radial extrusion of metal through an annular orifice to form an annulus expanded in diameter within the elastic limit of the material and of a predetermined thickness, in circularly rolling the expanded annulus to decrease the thickness thereof, further expanding the diameter and relieving the metal of the stresses incident to extrusion, and for simultaneously decreasing the width of the annular orifice so that successive extruded portions will be of decreasing thickness.

3. The method of forming metal disks comprising the radial extrusion of metal through an annular orifice of uniform width on all sides of the axis to form an annulus of a predetermined thickness and expanded in diameter within the elastic limit of the material, circularly rolling said annulus against a platen in rotatively fixed relation thereto to relieve the metal from stresses incident to extrusion to further expand the diameter and to decrease the thickness, and in progressively decreasing the width of said annular orifice to correspond to the thickness of the adjacent rolled portion.

4. The method of forming metallic disks comprising the radial extrusion of metal through an annular orifice, of a width to form an annulus equal in mass to that of an outer zone of the completed disk, the radial expansion of said extruded portion being limited to be within the elastic limit of the metal extruded, in circularly rolling the extruded annulus to relieve the same from stresses incident to extrusion to expand in diameter and reduce in thickness to the predetermined dimensions, and in progressively decreasing the width of the extruding orifice so that successive extruded portions will be expanded and thinned to correspond to predetermined zones of the disk from the periphery inward.

5. A machine for forming a metal disk comprising a cylinder for receiving a billet, an abutment opposite an open end of said cylinder leaving an annular orifice therebetween, a plunger in said cylinder for extruding the billet radially through said annular orifice, a platen adjacent to the extruded portion and means for circularly rolling said extruded portion against said platen to further increase the diameter and decrease the thickness thereof.

6. A machine for forming metal disks comprising a cylinder for receiving a billet, an abutment opposite an open end of said cylinder and extending radially beyond the same forming an annular extrusion orifice, a plunger in said cylinder for extruding said billet through said orifice, a platen surrounding and extending radially outward from the open end of said cylinder, a roller having its axis extending radially from the axis of said cylinder mounted to rotate about said abutment, and means for moving said cylinder and platen relative to said abutment and roller to progressively decrease the width of said extrusion orifice and to roll the extruded portion against said platen.

7. A machine for forming metal disks comprising an open-ended cylinder for receiving a billet, an abutment opposite the open end of said cylinder and extending radially beyond the same leaving an annular extrusion orifice, a plunger in said cylinder for extruding said billet radially outward through said orifice, a platen adjacent to one side of said orifice, a rotating head adjacent the opposite side of said orifice, a roller having its axis extending radially of the axis of the cylinder mounted on said rotating head, and means for moving the elements on opposite sides of said orifice towards each other to progressively decrease the width of the orifice and to roll the extruded metal against said platen.

8. A machine for forming metal disks comprising a rigid frame, a cylinder for receiving a billet axially movable on said frame, an abutment fixed on said frame opposite an open end of said cylinder and extending radially beyond the same, a plunger in said cylinder, an hydraulic motor on said rigid frame for moving said plunger to extrude the billet radially through the annular orifice between said abutment and cylinder, a platen extending radially outward adjacent one side of said orifice, means adjacent to the opposite side of said orifice for circularly rolling the extruded portion against said platen, and hydraulic means on said rigid frame for moving said cylinder towards said abutment and simultaneously relatively moving said platen and rolling means towards each other whereby the extruded metal is progressively reduced in thickness and rolled against said platen to further enlarge and thin the same.

9. A machine for forming metal disks comprising a cylinder for receiving a billet, an abutment opposite an open end of said cylinder and extending radially beyond the same to form an annular extrusion orifice, a plunger in said cylinder for extruding the billet radially therefrom through said orifice, a platen and circular rolling means respectively adjacent to the opposite sides of said annular orifice, and means for moving said cylinder relative to said abutment and said platen relative to said rolling means in predetermined relation to the movement of said plunger whereby said annular extrusion orifice is progressively decreased in width and the extruded metal is circularly rolled against said platen to increase the diameter and decrease the thickness thereof and to relieve stresses incident to extrusion.

10. In a method of forming metal articles, the step of extruding metal radially through an annular orifice and in varying the width of said orifice to change the thickness of successive extruded portions.

11. In a method of forming metal articles, the step of extruding metal radially through an annular orifice and in decreasing the width of said orifice to correspondingly diminish the thickness of successive extruded portions.

JOSEPH E. BATIE.